June 5, 1945.  R. E. GORTON  2,377,492
RESILIENT MOUNT
Filed March 27, 1944

INVENTOR
Robert E. Gorton
BY Charles L. Shelton
ATTORNEY

Patented June 5, 1945

2,377,492

UNITED STATES PATENT OFFICE 2,377,492

RESILIENT MOUNT

Robert Elsbre Gorton, East Hartford, Conn., assignor to United Aircraft Corporation, East Hartford, Conn., a corporation of Delaware Application March 27, 1944, Serial No. 528,225

12 Claims. (Cl. 248—5)

This invention relates to improvements in engine suspension means and has particular reference to an imporved resilient mount which, while not limited thereto, is particularly adapted to the mounting of radial engines used in aircraft.

An object of the invention is to provide an improved engine suspension means for connecting an engine to its support including resilient vibration controlling means having a low spring rate at normal operating load, with as little deflection as possible in going from zero load to operating load, and having a sharply increasing spring rate above normal operating load to limit the deflection in this range.

A further object of the invention is to provide a resilient connecting means of the above type utilizing two springs each having a different load-deflection characteristic and so arranged as to subject both to equal load throughout the operating range and to divide the deflection between them inversely as their stiffnesses under each condition of loading.

A still further object of the invention is to provide a connecting means including two resilient members having different load-deflection characteristics, and arranged to reduce the total stiffness of the mount in compression over a portion of the load range.

A still further object of the invention is to provide a resilient connection comprising two serially arranged resilient elements bonded together and subjected to identical loading.

A yet further object is generally to improve the construction and effectiveness of resilient engine mounts.

In the drawing, in which similar reference characters designate similar parts in the several views, one embodiment of the invention is illustrated for purposes of disclosing the invention.

Figure 1:
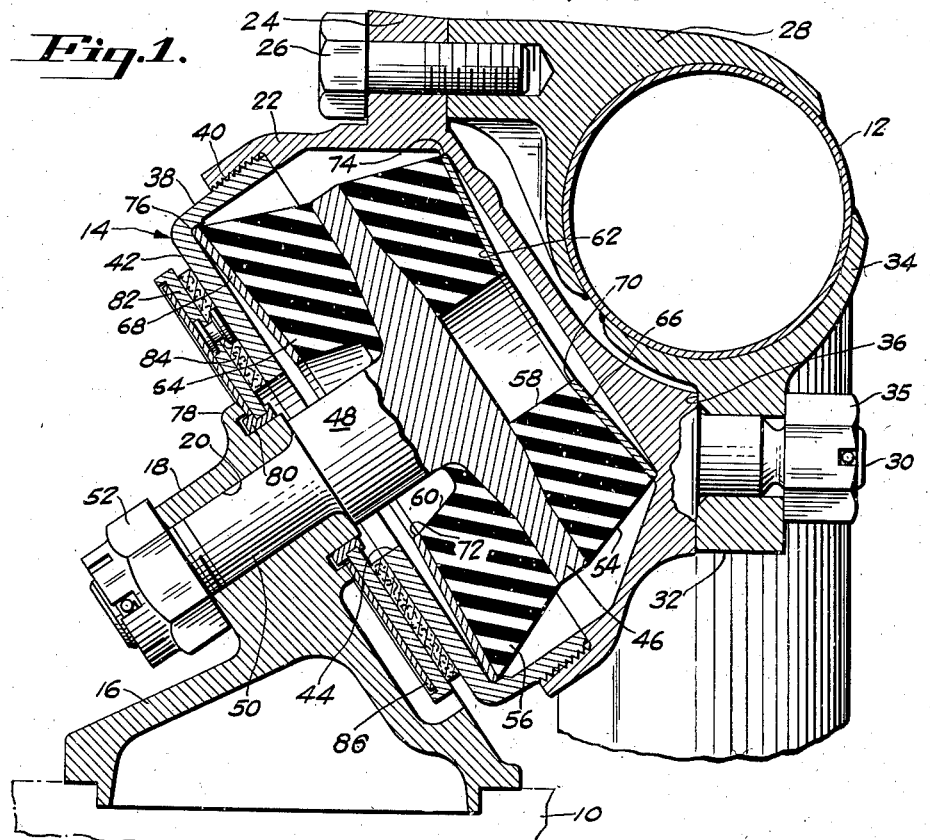
Fig. 1 is a sectional view through an engine mount constructed in accordance with the invention.

Referring to Fig. 1, the engine 10, which may be of the radial air-cooled type commonly used in aircraft, is supported on the mounting ring 12 by a plurality of vibration suppressing mounting units one of which is generally indicated at 14. The ring 12 is rigidly connected to the aircraft by a plurality of angularly related struts (not shown) in a well known manner.

The units 14 are angularly spaced around the engine mounting ring and each comprises a number of separable parts including a member connected with the mounting ring, a member connected with the engine, and a core unit including resilient material which is interposed between said members. The engine connected member of the unit includes the pedestal 16 suitably connected to the engine by cap screws (not shown) and terminating in an upstanding lug 18 having an oblique passage 20. The ring connected member includes a two-part housing comprising a cup member 22 having at one side of its bottom a pair of laterally spaced lugs, one of which is shown at 24, through which horizontally disposed cap screws 26 extend into a boss 28 which is secured as by welding to the ring 12. A stud 30 projects horizontally from the other side of the bottom wall of cup member 22 through a radially inwardly directed lug 32 of a boss 34 welded to the inner periphery of ring 12, a nut 35 being threaded on the stud to secure the shoulder 36 at the base of stud 30 against lug 32. A complemental cup-shaped cover member 38 forms a closure for cup member 22, members 22 and 38 having their rims detachably connected by screw-threads 40. The cover member 38 has a flat bottom wall 42 provided with a central aperture 44 which is somewhat larger than passage 20.

The core unit comprises a mushroom shaped member having a head, or plate, portion 46 disposed approximately centrally in the ring supported housing member and a shank, or stem, portion 48 which has a reduced portion 50 received in passage 20 and secured therein by a nut 52. The head portion 46 has resilient blocks of rubber 54 and 56 permanently secured to the opposite faces thereof, as by vulcanizing, these blocks having axial passages 58 and 60 respectively therethrough. Further, these blocks 54 and 56 have their remote annular faces 62 and 64 dished, or tapered inwardly toward their axis and have permanently bonded thereto, as by vulcanizing or cementing, the dished plate springs 66 and 68 which, in their unstressed state, conform to the dished surfaces 62 and 64. The plate spring 66 has a central annular aperture 70 which is of the same diameter as aperture 58 in block 54 and plate spring 68 also has a central annular aperture 72 which is of the same diameter as aperture 60 in block 56 at the dished face thereof and large enough to space the inner periphery of the disk spring a substantial distance from the shank portion 48 of the core member.

The cup members 22 and 38 are provided with accurately machined recesses 74 and 76 respectively which receive the outer peripheries of plate springs 66 and 68 and position the core member against lateral displacement in the housing. As shown, the annular side walls of blocks 54 and 56 are frustro-conical, extending in straight lines from the periphery of the plate springs 66 and 68 to the periphery of the head portion 46 of the core member. These side walls may, however, be formed as concave or convex surfaces to vary the resilience of the blocks in compression to meet varying requirements.

Friction damping means are provided between the engine connected and ring connected members for suppressing relative movement of these members by forces which place the resilient blocks of the core member in shear. The lug 18 is provided with an annular shoulder 78 concentric with the shank 48 and provided with an annular bushing 80 having a peripheral groove supporting an annular plate 82 parallel but spaced from the external flat bottom surface 42 of cup 38. A disk of friction material 84 carried by plate 82 occupies this space and is pressed constantly against surface 42 by a disk spring 86 located between plate 82 and shoulder 78 and held in semi-compressed position by engagement of its inner periphery with shoulder 78 and by engagement of its outer periphery with plate 82.

Vibrational forces acting in the direction of the major axis of the unit will place the rubber blocks 54 and 56 and their attached plate springs 66 and 68 in compression. Further, since these loads are transmitted through the rubber blocks and plate springs in series, the blocks and springs will each be subjected to equal loading while the deflection of each rubber block and its attached plate spring under load will always be divided between them inversely as their stiffnesses.

Figure 2:
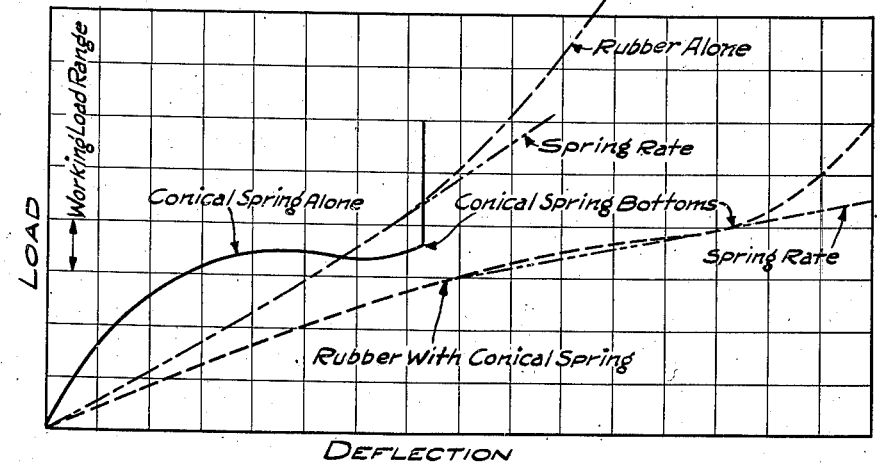
Fig. 2 is a graph illustrating the load deflection characteristics of each of the two resilient elements comprising the core of the mount and also the load deflection characteristics of the assembled core.

Referring to Fig. 2, it will be noted that when load is applied axially to a conical plate spring it has a very high spring rate initially but that its spring rate becomes very low as the spring approaches its flattened condition. The rubber block also has a very high spring rate which is substantially constant throughout the range indicated. As a result of the construction above described, the stiffness in compression of the combined rubber and metal spring provides a very low spring rate in a portion of the load deflection curve and in accordance with this invention the metal and rubber springs are combined so that this portion of the curve will fall in the working load range of the unit as indicated by the lower curve in Fig. 2. It will be evident that as result of this construction it has been made possible to get the desired low spring rate throughout the working load range with a minimum of deflection in going from zero load to the working load range, while also providing a sharply increasing spring rate above this normal working range.

While one embodiment of the invention has been described and illustrated in the accompanying drawing, it will be evident that numerous changes may be made in the construction and arrangement of the parts without departing from the scope of the invention as defined by the following claims:

1. A flexible engine mount comprising a member secured to an engine to be supported and a member secured to a support for the engine, and a resilient unit interposed between opposed surfaces of said members including a rubber cushion and a conical plate spring bonded together in series.

2. A flexible engine mount comprising a member secured to an engine to be supported and a member secured to a support for the engine, and a resilient unit interposed between opposed surfaces of said members including a rubber cushion and a conical plate spring bonded together in their unstressed condition for absorbing forces exerted parallel to the axis of flexure of said plate spring.

3. A flexible engine mount comprising a member secured to an engine to be supported and a member secured to a support for the engine, and a combined metal and rubber spring interposed between opposed surfaces of said members including a rubber cushion having a dished face confronting one of said surfaces and a dished plate spring conforming to said face and bonded thereto, said combined metal and rubber spring acting to absorb forces acting parallel to the axis of flexure of said plate spring.

4. A flexible engine mount comprising a member secured to an engine to be supported and a member secured to a support for the engine, and a combined metal and rubber spring interposed between opposed surfaces of said members including a rubber cushion having an axial passage therethrough and having a frustro-conical face confronting one of said surfaces and a frustro-conical plate spring conforming to said face in its unloaded condition and bonded thereto, said combined metal and rubber spring acting to absorb forces exerted parallel to the axis of flexure of said plate spring.

5. A flexible engine mount comprising a member secured to an engine to be supported and a member secured to a support for the engine, a combined metal and rubber spring interposed between opposed surfaces of said members including a rubber cushion and means for reducing the stiffness of said combined spring in compression over a portion of the load range comprising a dished plate spring molded in substantially an unloaded condition to a face of said cushion against which said forces are exerted.

6. A flexible engine mount comprising a member secured to an engine to be supported and a member secured to a support for the engine, one of said members comprising a hollow separable housing having an aperture in one wall thereof, a core assembly disposed in said housing having a stem smaller than said aperture extended through said aperture and carried by the other of said members, said core assembly comprising a head portion on said stem, a rubber cushion bonded to each side of said head, and means for increasing the stiffness of said cushions along their major compressive axis over a portion of the load range comprising a conical plate spring bonded to the outer face of each of said cushions, said plate springs having their outer peripheries received within the inner walls of said housing and positioning said assembly against lateral movement relative thereto.

7. A flexible engine mount comprising a member secured to an engine to be supported and a member secured to a support for the engine, one of said members comprising a hollow separable housing having an aperture in one wall thereof, a core assembly disposed in said housing having a stem smaller than said aperture extended through said aperture and carried by the other of said members, said core assembly comprising a head portion on said stem, a rubber cushion bonded to each side of said head having an annular frustro-conical outer face, and means for increasing the stiffness in compression of said cushions along their major compressive axis over portions of the load range which are below and above the normal working load range while maintaining the stiffness in compression substantially unchanged over said working load range which comprises a frustro-conical plate spring bonded to the outer face of each of said cushions, said plate springs having their outer peripheries received within the inner walls of said housing and positioning said assembly against lateral movement relative thereto.

8. A resilient core unit for an engine mount including a resilient cushion, and means for increasing the stiffness of said cushion along its major compressive axis over a portion of the load range comprising a conical plate spring bonded to a surface of said cushion which is transverse to said axis.

9. A resilient core unit for an engine mount including a resilient cushion of rubber-like material, and means for increasing the stiffness of said cushion along its major compressive axis over the portions of the load range which are above and below the normal working load range while maintaining the stiffness in compression along said axis substantially unchanged over said working load range comprising, a conical plate spring bonded to a surface of said cushion which is transverse to said axis.

10. A resilient core member for an engine mount having a low spring rate over its working load range and having an increased spring rate from zero load to said range comprising, a resilient cushion having one surface thereof which is transverse to its major compressive axis dished, and a dished plate spring bonded to said surface.

11. A core assembly for an engine mount comprising a core member including a plate having a stem projecting from one face thereof, resilient cushions of rubber bonded to opposed faces of said plate, the cushion on the stem side of said plate having an aperture larger than the diameter of said stem and through which the latter extends, and frustro-conical plate springs bonded to the remote faces of said cushions.

12. A core assembly for an engine mount comprising a core member including a plate having a stem projecting from one face thereof, resilient cushions of rubber bonded to opposite faces of said plate, the cushion on the stem side of said plate having an axial aperture larger than the diameter of said stem and through which the latter extends, the exposed ends of said cushions being dished to provide frustro-conical surfaces thereon, and frustro-conical plate springs conforming substantially to said faces in their unstressed condition and bonded to said surfaces.

ROBERT ELSBRE GORTON.